Patented Aug. 13, 1940

2,210,966

UNITED STATES PATENT OFFICE 2,210,966

PURIFICATION OF POTABLE WATER

Oliver M. Urbain and William R. Stemen, Columbus, Ohio, assignors to Charles H. Lewis, Harpster, Ohio No Drawing. Application July 3, 1937, Serial No. 151,949

8 Claims. (Cl. 210—23)

This invention relates to the purification of potable water. More particularly, it relates to the removal of fluorides whereby potable waters are rendered less harmful for drinking and industrial purposes.

It has been definitely established that the presence of fluoride ions in potable water, used both for drinking and cooking purposes, is the cause of mottling of tooth enamel. Mottling takes place more especially in children while calcification is taking place. Water containing over one part per million (1 p. p. m.) of fluoride has been shown to cause mottling and, therefore, is harmful for human consumption purposes. The process of this invention will effect the removal of fluorides to a point well below 1 p. p. m. and render such waters fit for domestic consumption.

The waters of many of the States west of the Mississippi River contain fluorides in toxic quantities. Fluorides also occur quite generally in toxic quantities in the water from wells over fifty feet deep in the central and eastern States. As much as 5.0 p. p. m. of fluoride are found in the water from some wells in Ohio. Such waters, which otherwise could be used for domestic purposes without purification, are unfit for use because of the presence of these fluorides.

Activated alumina and other substances for the removal of fluorides have been proposed and are in use. However, these materials often fall short of reducing the fluoride content of water below the toxic point, particularly when the original fluoride content is quite high. With some materials it is necessary to control closely the pH of the solution being treated. With other materials the length of contact time required for the treatment makes the use of such processes disadvantageous. Still other objections to some of the known processes are the excessive costs and the difficulty of regeneration of the materials.

Accordingly it is an object of this invention to provide a simple and efficient method for the removal of fluorides from drinking and industrial waters. More particularly, it is an object to provide a simple and economic method by which the content of fluorides may be reduced below the recognized toxic point of 1 p. p. m. even in waters of high original fluoride content.

Another object of this invention is to provide a method which is operative at any normal pH concentration of the waters being treated.

Another object is to provide a method in which the presence of anions and cations of other salts does not affect in any manner the efficiency of the removal of the fluorides.

An additional object is to provide a method which will permit a short yet efficient contact period.

A further object is to provide a method whereby the treating agent may be quickly regenerated and reused for treatment of additional water.

Broadly, the process of our invention comprises contacting the water containing fluoride ions with a material or compound made by treating an adsorbent or sorptive material with a strong solution of an aluminum salt. We have found that when such adsorbent or sorptive materials are treated with a rather concentrated solution of aluminum salts, there are produced materials having fluoride removing properties to an extent heretofore unknown in the art. Such materials may then be added in powdered form to the liquid being treated in a manner analogous to the present-day use of activated carbon for eliminating taste and odor from potable waters. Alternatively, the materials may be placed in contact filters and the liquid passed through the filters in the conventional manner. By effecting the treatment in this second method, the materials can readily be regenerated at small cost.

More specifically, we form our material by pickling the adsorption or sorptive materials, such as active carbon, adsorbent clays, fuller's earth, bentonite, Cottrell dust, silica gel, and all like adsorbents, in a solution which is wholly or partially saturated with an aluminum salt such as the sulfate, chloride, nitrate, acetate, or the various alums, for a period of approximately five hours. The adsorbent material containing free alkali, e. g., Cottrell dust, must be washed free of the alkali before being pickled to prevent the precipitation of aluminum hydroxides by the aluminum salt solution. A suitable concentration of the aluminum salt solution is from 50 to 100% of the amount necessary for saturation. The excess reagent is then drawn off and the solid mass washed and, if desired, either air-dried or mechanically dried at a temperature not exceeding 70° C.

We have found that the materials employed in our process may be regenerated in a very short time by using such regenerating agents as soluble aluminum salts, dilute mineral acids, or dilute alkalis. Our experiments have shown that all of these regenerating agents are effective but that the soluble aluminum salts are the most efficient. Regeneration is accomplished by the conventional process of flowing the regenerating agent over the exhausted fluoride removing material.

By such processes, we have effected reduction of fluorine content in a stock solution containing 8.0 p. p. m. of fluorides to a content ranging from zero to a few tenths of 1 p. p. m. Only a fifteen-minute period of contact is necessary, and if the contact filter method is used, the treating agent can be completely regenerated in five minutes.

As exemplary of the results obtained by our process, we give below a series of representative tests. Our materials were tested by determining the efficiency of the untreated adsorbent material and the efficiency of the treated material in the removal of fluorides. Quantities of the treated and untreated materials were contacted with portions of a stock fluoride solution containing eight parts per million of fluorine. The period of contact in each test was fifteen minutes. The stock solution contained many different ions, such as magnesium, calcium, iron, sodium, sulfate, chloride, phosphate, etc., and was prepared with tap water. The treated materials were prepared by pickling the adsorbent material as specified with a strong solution of aluminum sulfate for five hours, washing out the sulfate, and then air-drying.

*Example No. 1*

Fuller's earth before treatment removed 0.5 p. p. m. of fluoride from the stock solution. After treating the fuller's earth with aluminum sulfate, the treated material removed 7.4 p. p. m. of fluoride.

*Example No. 2*

Activated alumina removed 0.6 p. p. m. of fluorine before treatment and 7.5 p. p. m. after treatment.

*Example No. 3*

Activated carbon removed 0.2 p. p. m. before treatment and 7.6 p. p. m. after treatment. An analogous example was carried out using a stock fluoride solution made with distilled water in order to exclude the ions of other salts. The same results were attained, thus showing the presence of ions of other salts to have no effect on fluorine removal by this process.

*Example No. 4*

Dehydrated silica gel removed 6.1 p. p. m. before treatment and 7.2 p. p. m. after treatment. It is seen from these results that even the high affinity for fluorine of silica gel is increased by treatment with an aluminum salt in accordance with our disclosure.

*Example No. 5*

A sample of kaolin removed 0.6 p. p. m. before treatment and 7.7 p. p. m. after treatment.

The results of the foregoing tests are tabulated in the following table:

| Examples | Fluorine stock fluoride solution, p. p. m. | Reduction in fluorine, p. p. m. | Reduction in fluorine, percent |
|---|---|---|---|
| 1. Fuller's earth untreated | 8.0 | 0.5 | 6.0 |
| Fuller's earth treated | 8.0 | 7.4 | 93.0 |
| 2. Activated alumina untreated | 8.0 | 0.6 | 7.5 |
| Activated alumina treated | 8.0 | 7.5 | 94.0 |
| 3. Activated carbon untreated | 8.0 | 0.2 | 2.5 |
| Activated carbon treated | 8.0 | 7.6 | 95.0 |
| 4. Silica gel untreated | 8.0 | 6.1 | 76.0 |
| Silica gel treated | 8.0 | 7.2 | 90.0 |
| 5. Kaolin untreated | 8.0 | 0.6 | 7.5 |
| Kaolin treated | 8.0 | 7.7 | 96.0 |

Similar results were obtained when the materials were treated with solutions of aluminum chloride, nitrate, acetate, and various alums.

All operations were checked using a stock fluoride solution made up with distilled water instead of tap water. In this way, any and all conflicting ions were eliminated. It was found that the ions in tap water in no way affected the results. This process is, therefore, effective regardless of the ions present in the water to be treated.

We attribute the efficacious removal of fluoride ions by our process to the fact that when adsorption or sorptive materials are treated with a strong solution of an aluminum salt, the aluminum ion, $Al^{+++}$, is adsorbed. We have found that the aluminum cannot be washed from our finished product. Therefore, it appears that the aluminum has entered into the chemical structure of the material. This results in the selective removal of fluorides to a degree not to be expected from a combination of two known materials. In addition, materials prepared according to our disclosure do not have the disadvantages normally associated with the individual components when applied in other processes for the removal of fluorides.

It is to be expressly understood that the foregoing description and the examples we have given are merely illustrative and are not to be considered as limiting our invention beyond the scope of the subjoined claims.

Having thus described our invention, we claim:

1. The process of removing fluorides from water comprising contacting the water with a sorptive material which has been treated with a highly concentrated aluminum salt solution.

2. The process of removing fluorides from water comprising the steps of bringing the water into contact with a sorptive material which has been treated with a highly concentrated aluminum salt solution, regenerating the treated sorptive material when exhausted, and bringing additional quantities of water into contact with the regenerated treated sorptive material.

3. In a process for removing fluorides from water as described in claim 2, the step comprising regenerating the treated sorptive material with a regenerating agent selected from the class of aluminum salt solutions.

4. The process of removing fluorides from water comprising exposing the liquid to a sorptive material selected from the class comprising active carbon, adsorbent clays, fuller's earth, bentonite, Cottrell dust, and silica gel, said material having been treated with a highly concentrated aluminum salt solution.

5. The process of removing fluorides from water comprising exposing the liquid to an active carbon which has been treated with a highly concentrated aluminum salt solution.

6. The process of removing fluorides from water comprising exposing the liquid to an adsorbent clay which has been treated with a highly concentrated aluminum salt solution.

7. The process of removing fluorides from water comprising exposing the liquid to a silica gel which has been treated with a highly concentrated aluminum salt solution.

8. The process of removing fluorides from water comprising contacting the water with a sorptive material which has been treated with a highly concentrated solution of an aluminum salt selected from the class consisting of aluminum sulfate, chloride, nitrate, acetate, and the alums.

OLIVER M. URBAIN.
WILLIAM R. STEMEN.